US012807308B2

(12) United States Patent
Desvigne et al.

(10) Patent No.: US 12,807,308 B2
(45) Date of Patent: Nov. 24, 2026

(54) ROTARY WING BLADE OF AN AIRCRAFT, AND AIRCRAFT PROVIDED WITH SUCH A BLADE

(71) Applicant: AIRBUS HELICOPTERS, Marignane Cedex (FR)

(72) Inventors: Damien Desvigne, Marignane Cedex (FR); Enric Roca-Leon, Marignane Cedex (FR); Paul Eglin, Marignane Cedex (FR); Manousos Kelaidis, Marignane Cedex (FR); Rémi Coisnon, Marignane Cedex (FR); Bernard-René Michel, Marignane Cedex (FR); Jean-Paul Pinacho, Marignane Cedex (FR)

(73) Assignee: AIRBUS HELICOPTERS, Marignane Cedex (FR)

(*) Notice: Subject to any disclaimer, the term of this patent is extended or adjusted under 35 U.S.C. 154(b) by 0 days.

(21) Appl. No.: 19/075,471

(22) Filed: Mar. 10, 2025

(65) Prior Publication Data

US 2026/0138737 A1 May 21, 2026

(30) Foreign Application Priority Data

May 17, 2024 (FR) .................................. FR2405108

(51) Int. Cl.
*B64C 27/467* (2006.01)
*B64C 27/06* (2006.01)
*B64C 27/46* (2006.01)

(52) U.S. Cl.
CPC ............ *B64C 27/467* (2013.01); *B64C 27/06* (2013.01); *B64C 27/463* (2013.01)

(58) Field of Classification Search
CPC ...... B64C 27/467; B64C 27/473; B64C 11/20
See application file for complete search history.

(56) References Cited

U.S. PATENT DOCUMENTS 4,392,781 A * 7/1983 Mouille ................ B64C 27/467 416/223 R
5,332,362 A 7/1994 Toulmay et al.
(Continued)

FOREIGN PATENT DOCUMENTS

EP 0565413 A1 10/1993
EP 0842846 A1 5/1998
(Continued)

OTHER PUBLICATIONS

French Search Report for French Application No. FR2405108, Completed by the French Patent Office, Dated Dec. 2, 2024, 11 pages.

(Continued)

*Primary Examiner* — Ashesh Dangol
(74) *Attorney, Agent, or Firm* — BROOKS KUSHMAN P.C.

(57) ABSTRACT

A blade for a rotary wing able to rotate about an axis of rotation, the blade extending along the pitch axis from a first end to a second end, the blade comprising a blade body having, from the first end to the second end, a succession of sections substantially perpendicular to the pitch axis. Along its pitch axis, the blade has sections having: increasing and then decreasing chords, a relative thickness that decreases from an initial section to a final section, twist angles that continuously increase from the origin section to an initial section and then decrease, and a changing offset relative to the pitch axis.

15 Claims, 9 Drawing Sheets

(56) References Cited

U.S. PATENT DOCUMENTS

| | | | | |
|---|---|---|---|---|
| 5,609,472 | A * | 3/1997 | Obukata | B64C 27/467 416/223 R |
| 6,000,911 | A | 12/1999 | Toulmay et al. | |
| 6,116,857 | A | 9/2000 | Splettstoesser et al. | |
| 7,331,765 | B2 * | 2/2008 | Falchero | B64C 27/467 416/228 |
| 2007/0110582 | A1 * | 5/2007 | Bagai | B64C 27/10 416/223 R |
| 2017/0174339 | A1 * | 6/2017 | Leusink | B64C 27/463 |
| 2017/0174340 | A1 | 6/2017 | Leusink et al. | |
| 2019/0128240 | A1 * | 5/2019 | Messing | F03D 1/0633 |
| 2019/0193851 | A1 * | 6/2019 | Alfano | B64C 11/18 |
| 2022/0111955 | A1 * | 4/2022 | Kelaidis | B23P 15/28 |

FOREIGN PATENT DOCUMENTS

| | | |
|---|---|---|
| EP | 0901961 A1 | 3/1999 |
| EP | 3501979 A1 | 6/2019 |
| FR | 3045564 A1 | 6/2017 |
| FR | 3045565 A1 | 6/2017 |

OTHER PUBLICATIONS

First Office Action for Korean Application No. 10-2025-0026162, dated Sep. 4, 2026, 7 Pages, including English Translation.

* cited by examiner

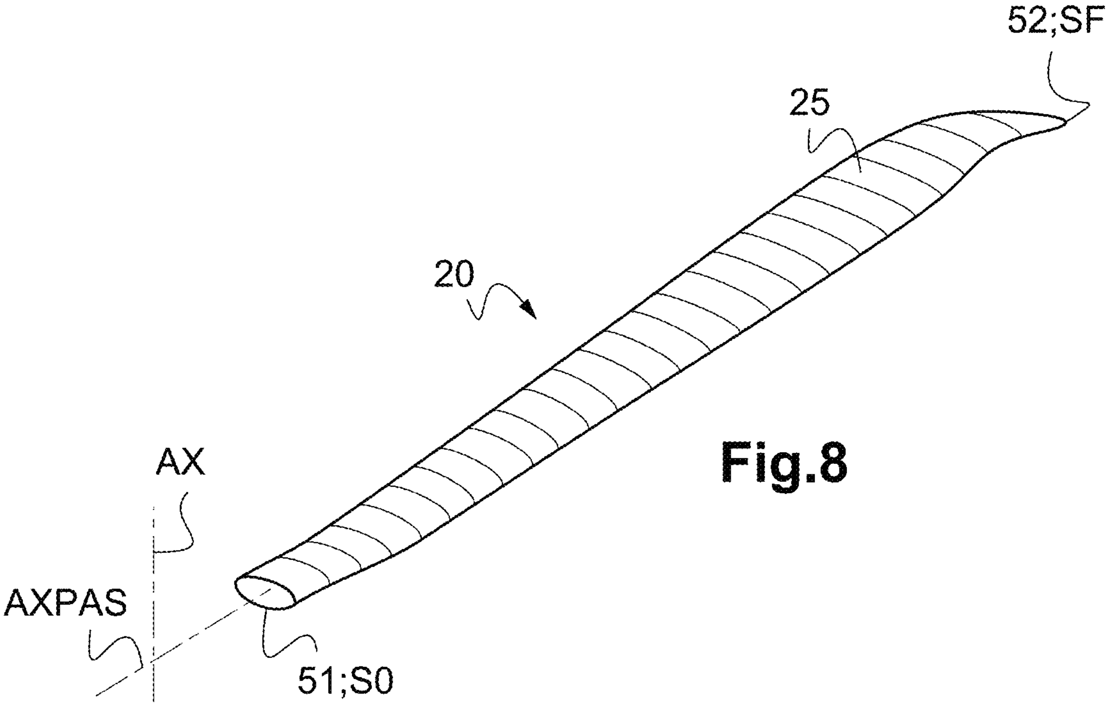
Fig.8
Fig.9
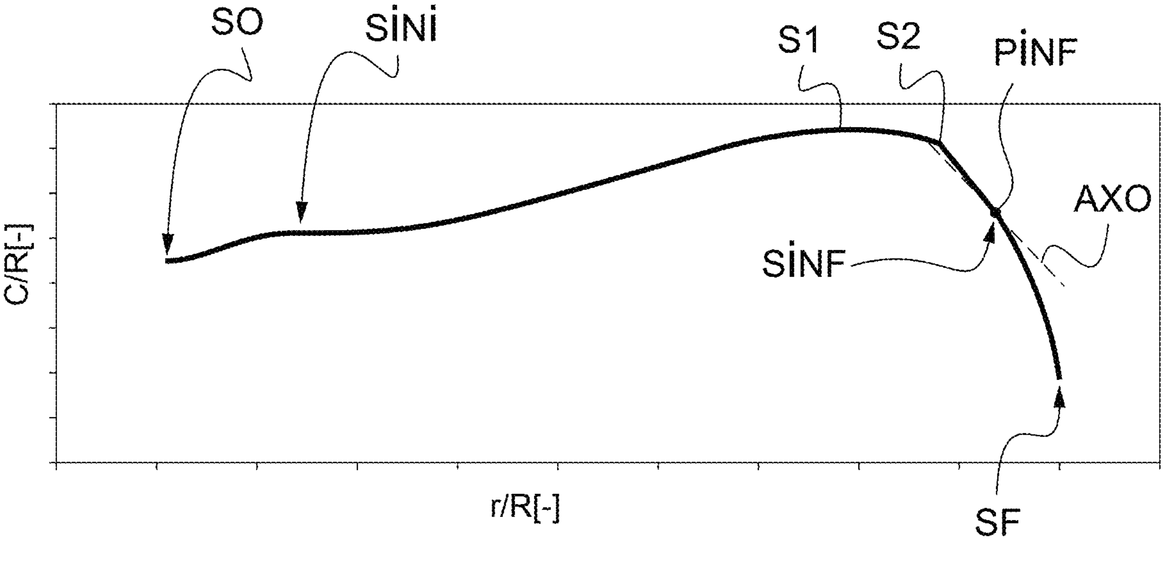

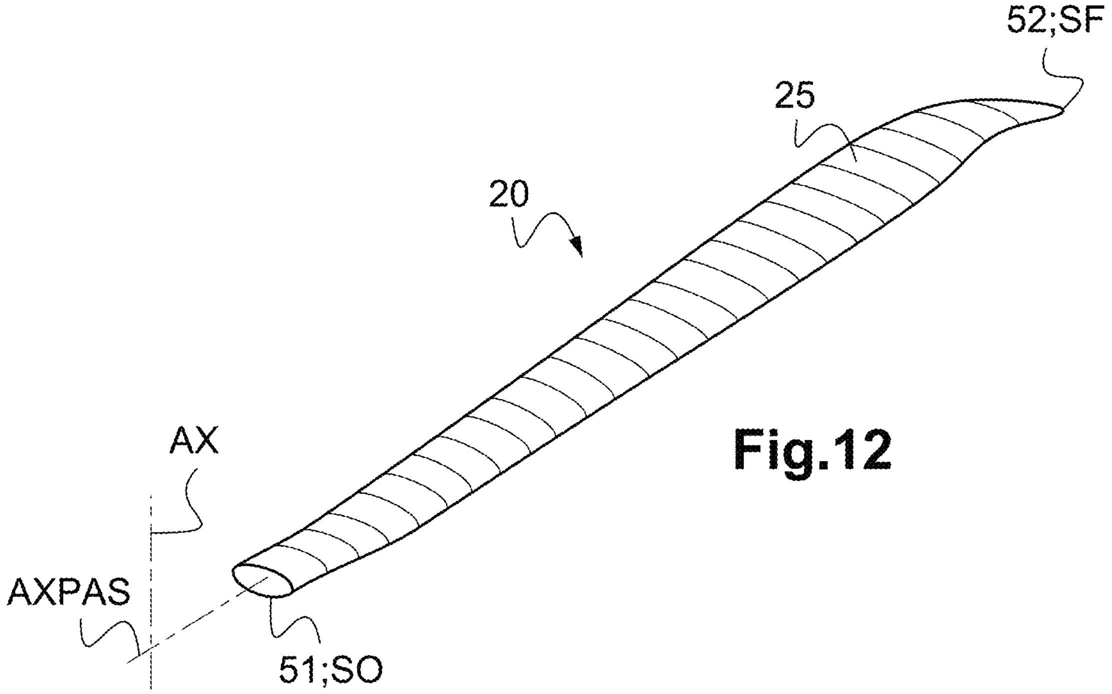
Fig.12
Fig.13
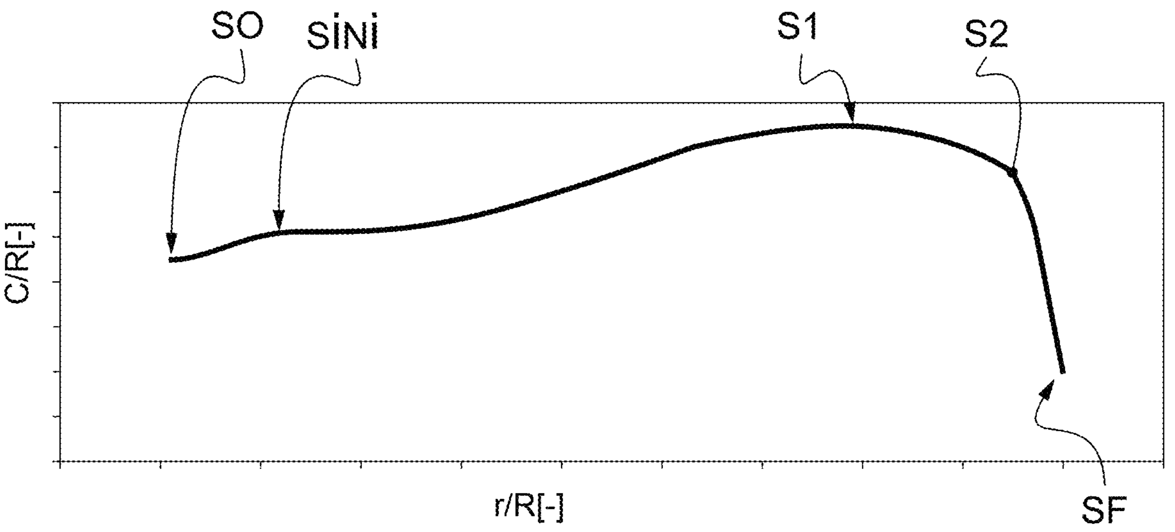

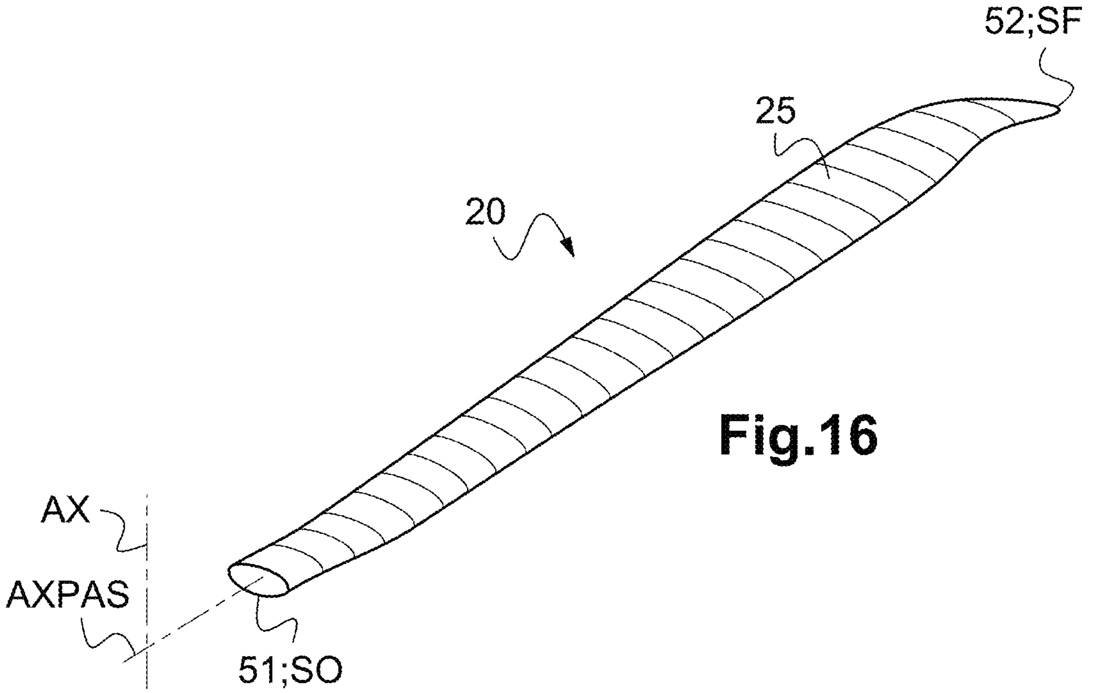
Fig.16
Fig.17
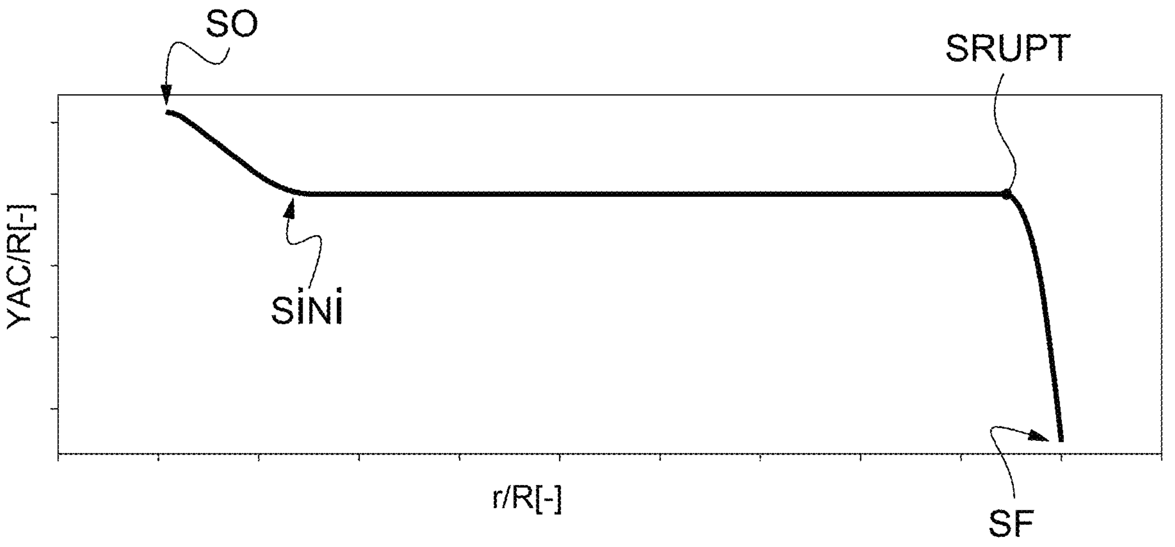

ROTARY WING BLADE OF AN AIRCRAFT, AND AIRCRAFT PROVIDED WITH SUCH A BLADE

CROSS REFERENCE TO RELATED APPLICATION

This application claims priority to French patent application No. FR 24 05108 filed on May 17, 2024, the disclosure of which is incorporated in its entirety by reference herein.

TECHNICAL FIELD

The present disclosure relates to a rotary wing blade of an aircraft, as well as to an aircraft having such a blade.

BACKGROUND

An aircraft may comprise a rotary wing provided with at least one blade. In particular, the blade is able to rotate about the axis of rotation of the rotary wing and its pitch axis. For example, each blade is connected to a pitch control system. Such a pitch control system may comprise actuators hinged to a lower plate of a set of swashplates, an upper plate of this set of swashplates being connected to each blade by a respective pitch connecting rod. The pitch control system may further comprise an upper scissors linkage connecting the upper plate to a rotor mast and a lower scissors linkage connecting the lower plate to a stationary casing. Each blade may also be connected to at least one member sometimes referred to as a “drag damper” or “frequency adapter”.

Such a blade comprises, depending on its span, a blade root intended to be attached to a hub, followed by an aerodynamic main part. The main part provides most of the lift of the blade According to another aspect, a rotary-wing aircraft has the advantage of being able to operate both at high forward speeds and at very low forward speeds, or even at zero speed during a hovering phase.

The geometrical features of a blade have an impact on the operation of the aircraft during forward flight at high speeds and flight at low speeds.

Indeed, the higher the forward speed, the greater the forces generated by the blades on the pitch control system, or even on the frequency adapters or the drag dampers. A manufacturer may seek to minimize these forces.

Moreover, a manufacturer seeks to obtain blades that make it possible to achieve favorable performance at low speeds, and in particular which enable take off with a maximized payload.

However, these two aims appear to be opposing. The reduction of the forces introduced at high forward speeds in the pitch control system, or even in the frequency adapters or the drag dampers, can indeed be obtained by acting on the geometric features of the blades, but generally to the detriment of the performance achieved at low speeds, and vice versa.

The blades of a conventional helicopter, referred to as “conventional blades” for convenience hereinafter, are thus dimensioned to generate acceptable forces in the pitch control system, or even in the frequency adapters or drag dampers, while making it possible to achieve favorable performance at low speeds.

Nevertheless, certain aircraft may operate at higher stabilized forward cruise speeds, for example greater than 200 knots instead of the 150 knots generally observed for a typical helicopter. At 200 knots and above, a conventional blade can introduce forces into the pitch control system, as well as into the frequency adapters or drag dampers, which may have an impact on their service lives.

Conventionally, a blade may be defined by means of the shape of the aerodynamic profiles of the sections of the blade and the positioning of these sections relative to one another. Thus, patent FR 3045564 describes a blade for a rotor of a rotary-wing aircraft, the blade extending on the one hand along a blade axis between a blade start capable of being connected to a hub of the rotor, and a blade tip. The blade comprises a profiled part located between the start of the blade and the tip of the blade, the profiled part consisting of a succession of aerodynamic profiles. The blade tip is located at a reference distance equal to a rotor radius R from the axis of rotation. The chord of the profiles, defined as the distance between the leading edge and the trailing edge of said profiles, of the profiled part increases between the start of the profiled part and a first section located at a first distance from the axis of rotation A of between 0.6*R and 0.9*R, the chord decreasing beyond the first section. The geometric twist of the profiles of the sections of the blade decreases between a second section located at a second distance from the axis of rotation of between 0.3*R and 0.4*R and the blade tip, a first gradient of the twist being between −25° divided by the radius R and −4° divided by the radius R between the second section and a third section located at a third distance from the axis of rotation A of between 0.4*R and 0.6*R, a second twist gradient being between −25° divided by the radius R and −4° divided by the radius between the third section and a fourth section located at a fourth distance from the axis of rotation A between 0.65*R and 0.85*R, a third twist gradient being between −16° divided by the radius R and −4° divided by the radius R between the fourth section and a fifth section located at a fifth distance from the axis of rotation between 0.85*R and 0.95*R, a fourth twist gradient being between −16° divided by the radius R and 0° divided by the radius R between the fifth section and the blade tip.

The twisting of a blade consists in varying the angles of the sections with respect to each other. The “twist angle” of a section shall mean the geometric angle formed between the chord line of that section and a line parallel to the chord line of a selected reference section of this blade. For convenience, it is considered hereinafter that a positive angle corresponds to a nose-up inclination of the section relative to the reference section. The change in the twist angles along the span of the blade is called the “twist law”.

Patent FR 3045565 describes a blade for a rotor of a rotary-wing aircraft comprising a profiled part located between the start of the blade and the tip of the blade. The blade tip is located at a reference distance equal to a rotor radius R from the axis of rotation A. The chord of the profiles of the profiled part increases between the start of the profiled part and a first section located at a first distance from the axis of rotation of between 0.6*R and 0.9*R, the chord decreasing beyond the first section. The blade has a forward sweep between the start of the profiled part and a second section located at a second distance from the axis of rotation A of between 0.5*R and 0.8*R, the leading edge forming a first forward sweep angle $\alpha 1$ of between 0° and 10° with the blade axis. The blade has a forwardly directed sweep between the second section and a third section S3 located at a third distance from the axis of rotation of between 0.6*R and 0.95*R, the leading edge forming a second forward sweep angle $\alpha 2$ of between 1° and 15° with the blade axis. In addition, the blade has a sweep directed towards the rear of the blade between the third section and the blade tip, the leading edge forming a third rear sweep angle α3 of between −35° and −15° with the blade axis B.

Documents EP 0565413 A1, EP 0842846 A1, and EP 0901961 A1 are also known.

SUMMARY

An object of the present disclosure is to provide a blade that limits the forces introduced on a pitch control system, or even on at least one frequency adapter or drag damper, at high speeds while making it possible to generate lift that gives a rotary-wing aircraft acceptable performance at low speeds, and in particular in hovering, and for example has performance that is at least substantially equivalent to the performance achieved on a conventional aircraft.

The present disclosure relates to a blade for a rotary wing of an aircraft, the blade being able to rotate about an axis of rotation of the rotary wing and about a pitch axis, said blade extending along the pitch axis from a first end to a second end, the blade comprising a blade body having, along the pitch axis, a blade root and then a main part formed by a succession of sections substantially perpendicular to the pitch axis, the blade body comprising, along the pitch axis, a blade root and then a main part, the blade root being provided with an origin section forming the first end, the main part extending along the pitch axis from an initial section to a final section forming the second end, the final section being located at a distance equal to a predetermined rotor radius R from said axis of rotation, each section extending along a transverse axis from a leading edge to a trailing edge separated by a maximum distance constituting a chord, each section of the blade body having a geometric twist angle with respect to a reference section located at a distance from the axis of rotation equal to 70% of the rotor radius R.

The blade also has the following features:

the initial section is disposed at a distance from the axis of rotation of between 20% and 30% of the rotor radius R;

in accordance with a law of spanwise variation of the chord of the sections, the chord of the sections increases from the origin section to a maximum chord reached in a first section located at a first distance from the axis of rotation of between 75% and 80% of the rotor radius R, then decreases in accordance with a law having, firstly, a slow decrease up to a second section and, secondly, a rapid decrease beyond the second section, the second section being located at a second distance from the axis of rotation of between 80% and 95% of the rotor radius R, an average aerodynamic chord dimensionless with respect to the rotor radius R being between 0.05 and 0.08, the maximum chord dimensionless with respect to the rotor radius R being greater than the average aerodynamic chord dimensionless with respect to the rotor radius R and between 0.06 and 0.1;

in accordance with a law of spanwise variation of relative thickness, the sections have a relative thickness which decreases from the origin section to the initial section from a relative thickness of between 0.25 and 0.70 up to a relative thickness of between 0.12 and 0.15, the main part having, from the initial section to an intermediate section, a constant relative thickness or a relative thickness which decreases and is then constant, the main part having a relative thickness which decreases moving away from the intermediate section up to a relative thickness of between 0.07 and 0.08 in the final section, the intermediate section being at a distance from the axis of rotation of between 65% and 85% of the rotor radius R;

in accordance with a twist law, the angles of geometric twist increase continuously from the origin section to the initial section from a minimum negative angle to a maximum positive angle, and then decrease with a first gradient of between −9° divided by the rotor radius R and −13° divided by the rotor radius R to a third section located at a distance from the axis of rotation of between 70% and 80% of the rotor radius R, then with a second gradient egal or higher than the first gradient up to a fourth section located at a distance from the axis of rotation of between 88% and 90% of the rotor radius R, i.e., a second gradient generating the same or a slower decrease than the first gradient, then with a third gradient less than the first gradient to the final section, i.e., a third gradient generating a higher decrease than the first gradient; and in accordance with an offset law, an offset distance separating the pitch axis from a quarter-chord line for each section, starting from the leading edge, decreases from the origin section to the initial section, this offset distance being constant in the main part of the initial section to a rupture section and then decreases, the rupture section being at a distance from the axis of rotation of between 80% and 95% of the rotor radius R; the offset distance being able to decrease from the rupture section in accordance with a decreasing law of order at least 2, namely according to a function for which the derivative and second derivative are also decreasing.

A blade is usually sized with respect to the desired rotor radius. This rotor radius is a feature conventionally associated with a blade. The length of the blade root can vary from one rotary wing to another, in order to always have the same main part and the same rotor radius, regardless of the dimensions of the rotary wing members carrying the blades.

Each section of the blade root can have a thick profile, i.e., having a relative thickness greater than 15% of its chord, and each section of the main part can have a thin aerodynamic profile, i.e., having a relative thickness less than or equal to 15% of its chord.

The mean aerodynamic chord is defined according to a weighting of the square of the radius:

$$\frac{c_{aero}}{R} = \frac{1}{R}\frac{\int_{r_0}^{1} c(r) r^2 \, dr}{\int_{r_0}^{1} r^2 \, dr}$$

with c(r) the law of spanwise variation of the chord of the sections, $r_0$ the distance separating the origin section from the axis of rotation, R the rotor radius and r the distance separating a section from the axis of rotation.

The main part comprises an intermediate part extending the blade root, then a tip. The tip starts, for example, at a distance from the axis of rotation equal to 80% of the rotor radius R. Therefore, the reduction in the loads generated by the blade is based in particular on the chords, twists and offsets obtained in the intermediate part of the main part, while the hovering performance is obtained by the shape of the tip of the main part, site of the highest speeds, especially in hovering flight.

In particular, the twist angle is relatively fine in the intermediate part, and leaves more freedom at the tip to optimize the performance of the aircraft in hovering flight, penalized by this choice of twist in the intermediate part. The chord law also makes it possible to maximize the area of the blade in the zone that is useful in forward flight, while reducing the chord in the inversion circle, which is naturally wider at high speed than with conventional helicopters.

The synergy of the aforementioned features makes it possible to obtain a blade enabling, firstly, reasonable forces to be generated on a pitch control system, or even on frequency adapters or drag dampers, and secondly acceptable performance to be achieved at low speeds.

By way of illustration, such a blade makes it possible to obtain performances substantially equivalent to a conventional blade at low speeds. The figure of merit when hovering obtained with such a blade is close to the figure of merit of a conventional blade for a rotor thrust corresponding to the operational flight envelope. In addition, the forces generated by such a blade at very high speeds, for example at 220 knots, are of the order of the forces generated by a conventional blade at high speed, i.e., for example at 150 knots.

The blade according to the disclosure may also comprise one or more of the following features.

Thus, the blade root may comprise profiles established according to the teaching of document EP 3501979 A1.

According to one possibility compatible with the preceding possibilities, the main part may comprise a first profile from the initial section to an internal section located at a distance from the axis of rotation of between 30% and 35% of the rotor radius R, a second profile from the internal section to the intermediate section, which is located for example at a distance from the axis of rotation equal to 70% of the rotor radius R, the second profile from the intermediate section to a transition section, which is located for example at a distance from the axis of rotation equal to 90% of the rotor radius R, a third profile from the transition section to the final section, and a fourth profile in the final section.

The first profile, the second profile, the third profile and the fourth profile are different, or may even be "OA" profiles known to a person skilled in the art. For example, the first profile may be in the form of the OA415 profile, the second profile may be in the form of the OA312 profile, the third profile may be in the form of the OA309 profile, and the fourth profile may be in the form of the OA407 profile.

According to one possibility compatible with the preceding possibilities, regardless of the embodiment, the blade may comprise all of the following features:

- the chord of the sections increases from the origin section to a maximum chord reached at an average rate of increase of 4.47%;
- the initial section has a relative thickness of 0.45, the main part having, from the initial section, a relative thickness which decreases linearly from a value of 0.15 to 0.12 at an internal section and is then constant up to the intermediate section, the intermediate section being at a distance from the axis of rotation equal to 70% of the rotor radius R;
- the twist angles increase in accordance with a convex law at the blade root, the first gradient being equal to −10° divided by the rotor radius R; and
- the quarter-chord line is located on the pitch axis at the origin section, the offset distance dimensionless with respect to the rotor radius R being equal to +0.041% of the rotor radius in a segment running from the initial section to the rupture section, the quarter-chord line of this segment being located between the pitch axis and the leading edge of the sections of this segment.

The synergy of the aforementioned features makes it possible to obtain a blade enabling reasonable forces to be generated at high speeds on a pitch control system, or even on frequency adapters or drag dampers.

In addition, the blade can comprise the following features:

- the initial section is disposed at a distance from the axis of rotation equal to 24% of the rotor radius R; and
- the mean aerodynamic chord dimensionless with respect to the rotor radius R is equal to 0.0651.

In particular, the following variants have different tips.

According to a first variant:

- the maximum chord dimensionless with respect to the rotor radius R is equal to 0.0746, the first distance being equal to 78.2% of the rotor radius R;
- the second distance is equal to 87% of the rotor radius R, the decrease in the chord of the sections of the main part going from −2.85% to −18.16% at the second section, the chord decreasing from the second section along a curve having an inflection point in an inflection section located at a third distance from the axis of rotation equal to 94.5% of the rotor radius R, the slope of the curve at the inflection point being along a horizontal axis;
- the main part has a relative thickness which decreases linearly moving away from the intermediate section, up to a relative thickness equal to 0.07 in the final section;
- the second gradient is equal to −7.3° divided by the rotor radius R, the third gradient is equal to −20° divided by the rotor radius R, the fourth section being at a distance from the axis of rotation equal to 88% of the rotor radius R; and
- the rupture section being at a distance from the axis of rotation equal to 85% of the rotor radius R, the offset distance dimensionless with respect to the rotor radius R being equal to 0.051 in the final section with a quarter-chord point located between the pitch axis and the trailing edge, the offset distance dimensionless with respect to the rotor radius R varying in accordance with a hyperbolic tangent law from the rupture section to the final section.

For example, said hyperbolic tangent law is defined by the equation:

$$\frac{YAC\left(\frac{r}{R}\right)}{R} = \frac{YAC_{tip}}{R} + \frac{YAC_0 - YAC_{tip}}{R\tanh\left[k\left(1 - \frac{r_D}{R}\right)\right]}\tanh\left[k\left(1 - \frac{r}{R}\right)\right]$$

with "YAC" the offset distance, "R" the rotor radius, "r" the radius separating the section concerned from the axis of rotation, "$YAC_{tip}$" equal to −0.051 multiplied by the rotor radius R, "$YAC_0$" equal to 0.041 multiplied by the rotor radius R, "$r_D/R$" equal to 0.85, and "k" equal to 23.1.

When hovering, this first variant can make it possible to obtain a figure of merit substantially equivalent to or even better than a conventional blade with a constant chord, for a rotor thrust corresponding to the operational flight envelope. In addition, the drop in the figure of merit may occur for higher thrusts compared to this conventional blade and compared to the operational need. This late drop in the figure of merit offers the possibility of expanding the operational need, for example as part of an upgrading of the aircraft equipped with this blade. For example, this late drop in the figure of merit may make it possible to increase the weight of the aircraft.

According to a second variant:

the maximum chord dimensionless with respect to the rotor radius R is equal to 0.0746, the first distance being equal to 78.2% of the rotor radius R;

the second distance is equal to 87% of the rotor radius R, the decrease going from −2.85% to −18.16% at the second section S2, the chord decreasing from the second section along a curve having an inflection point in an inflection section located at a third distance from the axis of rotation equal to 94.5% of the rotor radius R, the slope of the curve at the inflection point being along an oblique axis;

the main part having a relative thickness which decreases linearly moving away from the intermediate section to a thickness equal to 0.08 of a section located at a distance from the axis of rotation equal to 90% of the rotor radius R up to and including the final section;

the second gradient is equal to −7.3° divided by the rotor radius R, the third gradient is equal to −20° divided by the rotor radius R, the fourth section being at a distance from the axis of rotation equal to 88% of the rotor radius R; and the rupture section being at a distance from the axis of rotation equal to 91.5% of the rotor radius R, the offset distance dimensionless with respect to the rotor radius R being equal to 0.03384 in the final section with a quarter-chord point located between the pitch axis and the trailing edge, the offset distance dimensionless with respect to the rotor radius R varying in accordance with a hyperbolic tangent law from the rupture section to the final section.

Optionally, said hyperbolic tangent law is defined by the equation:

$$\frac{YAC\left(\frac{r}{R}\right)}{R} = \frac{YAC_{tip}}{R} + \frac{YAC_0 - YAC_{tip}}{R\tanh\left[k\left(1-\frac{r_D}{R}\right)\right]}\tanh\left[k\left(1-\frac{r}{R}\right)\right]$$

with "YAC" the offset distance, "R" the rotor radius, "r" the radius separating the section concerned from the axis of rotation, "$YAC_{tip}$" equal to −0.03384 multiplied by the rotor radius R, "$YAC_0$" equal to 0.041 multiplied by the rotor radius R, "$r_D/R$" equal to 0.85, "k" equal to 31.

When hovering, this second variant makes it possible to obtain a figure of merit substantially identical to that of the first variant, but with an earlier drop in the figure of merit.

According to a third variant:

the maximum chord dimensionless with respect to the rotor radius is equal to 0.0746, the first distance being equal to 78.2% of the rotor radius R;

the second distance is equal to 94.5% of the rotor radius R;

the main part having a relative thickness which decreases linearly moving away from the intermediate section, up to a relative thickness equal to 0.07 in the final section;

the second gradient is equal to −10° divided by the rotor radius R, the third gradient is equal to −20° divided by the rotor radius R, the fourth section being at a distance from the axis of rotation equal to 88% of the rotor radius R; and the rupture section being at a distance from the axis of rotation equal to 85% of the rotor radius R, the offset distance dimensionless with respect to the rotor radius R being equal to 0.051 in the final section with a quarter-chord point located between the pitch axis and the trailing edge, the offset distance dimensionless with respect to the rotor radius R varying in accordance with a predetermined law from the rupture section to the final section.

Optionally, said predetermined law is defined by the equation:

$$\frac{YAC\left(\frac{r}{R}\right)}{R} = \frac{YAC_{tip}}{R} + \frac{YAC_0 - \frac{d}{R}\exp\left[\left(\frac{r_D-u}{sig}\right)^2\right] - YAC_{tip}}{R\tanh\left[k\left(1-\frac{r_D}{R}\right)\right]}\tanh\left[k\left(1-\frac{r}{R}\right)\right] + \frac{d}{R}\exp\left[\left(\frac{r-u}{sig}\right)^2\right]$$

with "YAC" the offset distance, "R" the rotor radius, "r" the radius separating the section concerned from the axis of rotation, "$YAC_{tip}$" equal to −0.051 multiplied by the rotor radius R, "$YAC_0$" equal to 0.041 multiplied by the rotor radius R, "$r_D/R$" equal to 0.85, "k" equal to 23.1, "d" equal to −0.29% of the rotor radius R, "u" equal to 92.8% of the rotor radius R and "sig" equal to 3.7% of the rotor radius R.

When hovering, this third variant has a figure of merit that is reduced compared to those of the first and second variants for a rotor thrust corresponding to the operational flight envelope, but this figure of merit is maintained for thrusts greater than the operational need, which may offer the possibility of expanding this operational need for example in the context of an upgrade of the aircraft equipped with this blade.

According to a fourth variant:

the maximum chord dimensionless with respect to the rotor radius R is equal to 0.0746, the first distance being equal to 78.2% of the rotor radius R;

the second distance is equal to 94.5% of the rotor radius R;

the main part having a relative thickness which decreases linearly moving away from the intermediate section, up to a relative thickness equal to 0.07 in the final section;

the second gradient is equal to −10° divided by the rotor radius R, the third gradient is equal to −20° divided by the rotor radius R, the fourth section being at a distance from the axis of rotation equal to 88% of the rotor radius R; and the rupture section being at a distance from the axis of rotation equal to 94% of the rotor radius R, the offset distance dimensionless with respect to the rotor radius R being equal to 0.03384 in the final section with a quarter-chord point located between the pitch axis and the trailing edge, the offset distance dimensionless with respect to the rotor radius R varying in accordance with a predetermined law from the rupture section to the final section.

Optionally, said predetermined law is defined by the equation:

$$\frac{YAC\left(\frac{r}{R}\right)}{R} = \frac{YAC_{tip}}{R} + \frac{YAC_0 - \frac{d}{R}\exp\left[\left(\frac{r_D - u}{sig}\right)^2\right] - YAC_{tip}}{R\tanh\left[k\left(1 - \frac{r_D}{R}\right)\right]}\tanh\left[k\left(1 - \frac{r}{R}\right)\right] + \frac{d}{R}\exp\left[\left(\frac{r - u}{sig}\right)^2\right]$$

with "YAC" the offset distance, "R" the rotor radius, "r" the radius separating the section concerned from the axis of rotation, "$YAC_{tip}$" equal to −0.03384 multiplied by the rotor radius R, "$YAC_0$" equal to 0.041 multiplied by the rotor radius R, "$r_D/R$" equal to 0.85, "k" equal to 32, "d" equal to 0.15% of the rotor radius R, "u" equal to 95.5 of the rotor radius R and "sig" equal to 1.3% of the rotor radius R.

The fourth variant has similar performance to that of the third variant.

Regardless of the embodiment, the main part may comprise, starting from the blade root, an intermediate part followed by a tip, the tip having a zero dihedral relative to the intermediate part.

Alternatively, a dihedral angle is possible. The blade having a dihedral can enable more favorable performance to be achieved in hovering flight.

The disclosure also relates to a rotary wing provided with a hub that can move in rotation about an axis of rotation, the rotary wing comprising at least one blade according to the disclosure attached to the hub.

An aircraft may be provided with such a rotary wing. The aircraft may comprise a pitch control system for controlling the pitch of each blade of the rotary wing.

BRIEF DESCRIPTION OF THE DRAWINGS

The disclosure and its advantages appear in greater detail from the following description of examples given by way of illustration with reference to the accompanying figures, wherein:

FIG. 8 is a view of an exemplary blade according to the disclosure;

FIG. 9 is a diagram showing the change in the chord of the sections of the blade of FIG. 8 dimensionless with respect to the rotor radius;

FIG. 12 is a view of an exemplary blade according to the disclosure;

FIG. 13 is a diagram showing the change in the chord of the sections of the blade of FIG. 13 dimensionless with respect to the rotor radius;

FIG. 16 is a view of an exemplary blade according to the disclosure; and

FIG. 17 is a diagram showing the change in the offset of the sections of the blade of FIG. 16.

DETAILED DESCRIPTION

Elements present in more than one of the figures are given the same references in each of them.

Figure 1:
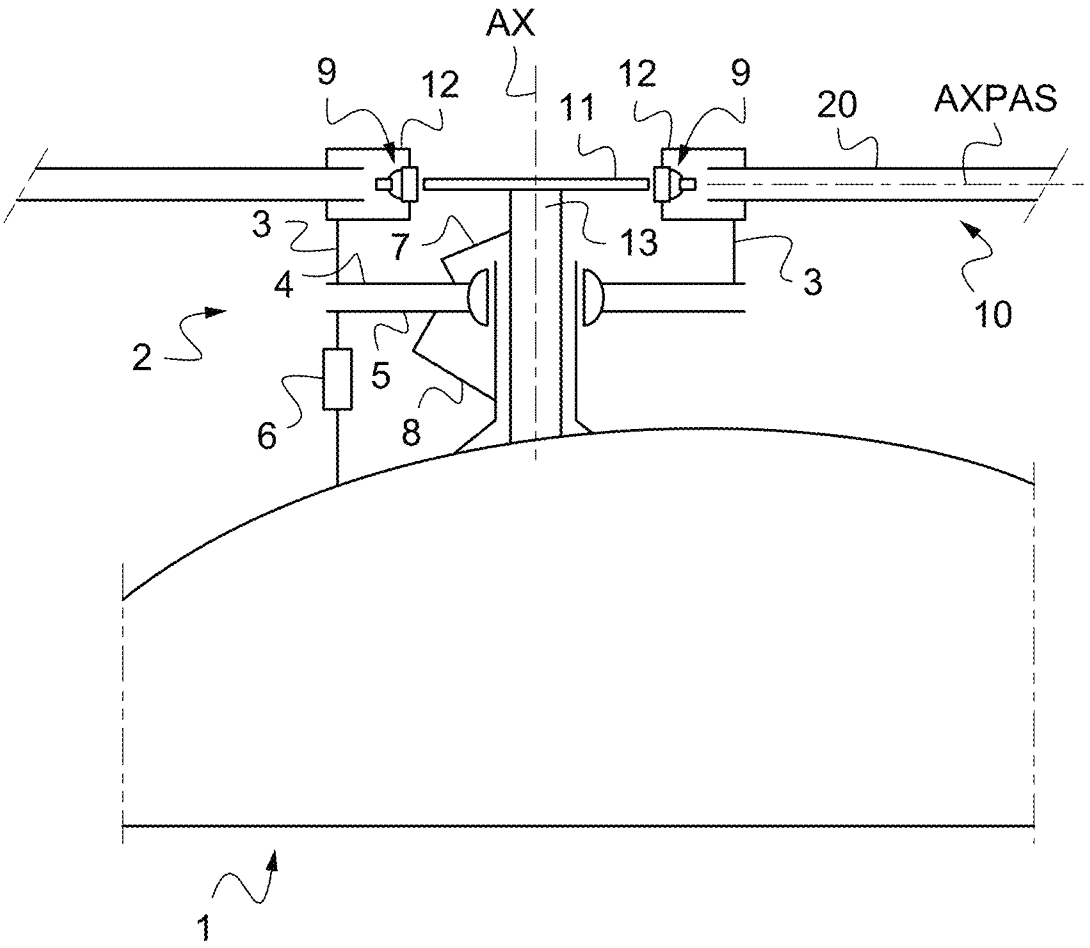
FIG. 1 is a partial diagram of a blade according to the disclosure arranged on a rotary wing of an aircraft.

FIG. 1 schematically shows a blade 20 according to the disclosure. Each blade 20 is a constituent part of a rotary wing 10 of an aircraft 1.

Each blade 20 may be carried by a hub 11, for example via a sleeve 12. According to the illustration given, the blade 20 is fixed to a sleeve 12 hinged by a laminated stop 9 at the hub 11. The hub 11 is constrained to rotate with a rotor mast 13 which rotates the hub 11 and the blades 20 about an axis of rotation AX.

In addition, each blade 20 is also able to move in rotation, in particular about its own pitch axis AXPAS, or even about a drag axis. The pitch axis AXPAS extends substantially in a vertical plane radial to the axis of rotation AX. In order to control the pitch of the blades, the aircraft 1 comprises a pitch control system 2.

This pitch control system 2 comprises, for example, several actuators 6 hinged to a lower plate 5 of a conventional set of swashplates. Each blade 20 is then hinged to a pitch rod 3, the pitch rods 3 also each being hinged to the upper plate 4 of the set of swashplates. An upper scissors linkage 7 can be articulated to the rotor mast 13 and to the upper plate 4, a lower scissors linkage 8 being articulated to the lower plate 5 and to a stationary support of the aircraft 1.

The aircraft 1 may also include frequency adapters or drag dampers. Each frequency adapter or drag damper is hinged to a blade 20 and to an adjacent blade or to the hub 11.

A blade 20 according to the disclosure can limit the forces exerted on the pitch control system 2 and on the frequency adapters or drag dampers at very high forward speeds of the aircraft 1, while giving the aircraft the usual performance at low speeds.

FIGS. 2 to 17 illustrate examples of blades 20 according to the disclosure.

Figure 2:
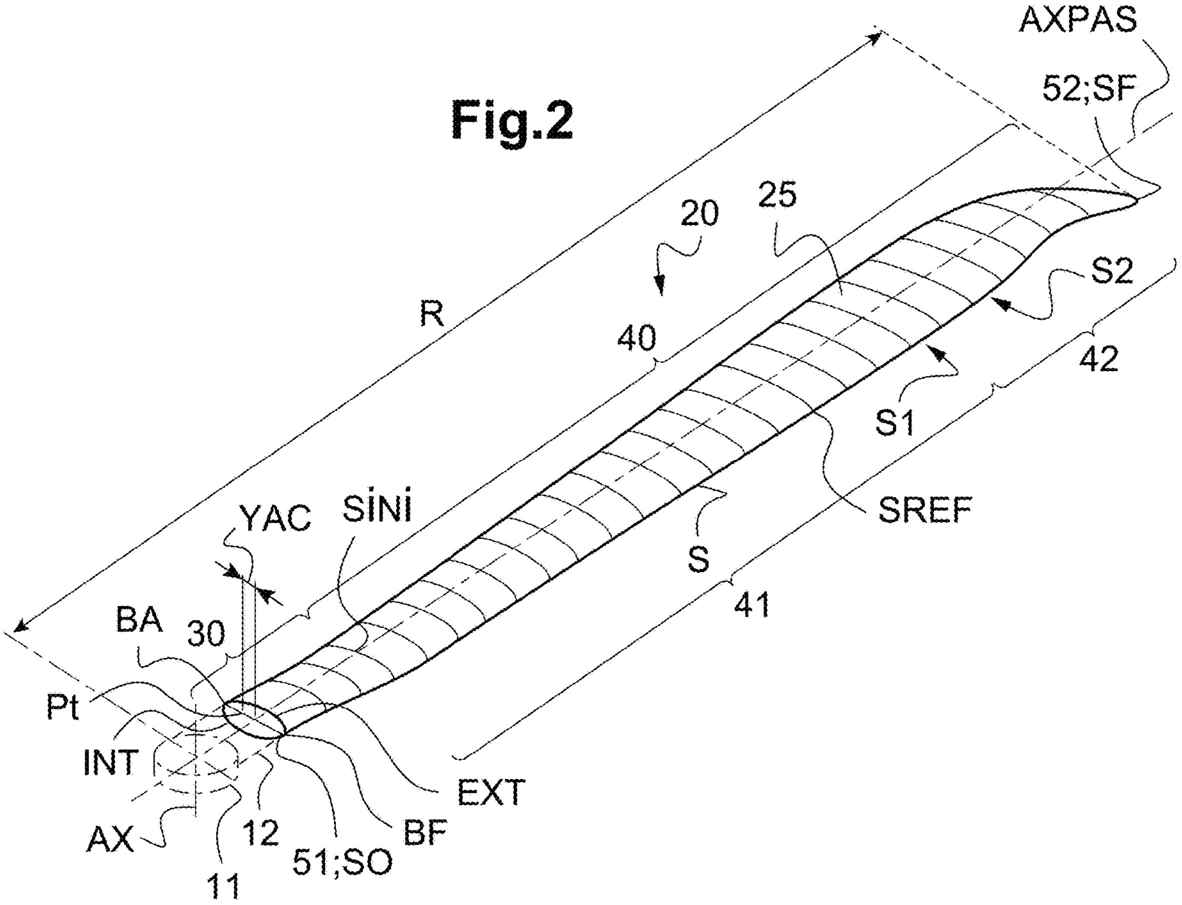
FIG. 2 is a view of an exemplary blade according to the disclosure.

Regardless of the embodiment and with reference to FIG. 2 for example, a blade 20 extends along the pitch axis AXPAS and, moving away from the axis of rotation AX, from a first end 51 to a second end 52. The distance separating the second end 52 from the axis of rotation AX is called the rotor radius R.

In particular, the blade 20 comprises a blade body 25 which has, in succession, along the pitch axis AXPAS and moving away from the axis of rotation AX, a blade root 30 and then a main part 40. The blade root 30 comprises the first end 51 and may be attached to the sleeve 11 in the example given. On the other hand, the main part 40 comprises the second end 52. The main part 40 may be broken down into an intermediate part 41 extended by a tip 42, the intermediate part 41 extending from the blade root 30 to a distance from the axis of rotation AX equal to 80% of the rotor radius R. The tip 42 may have a zero dihedral relative to the intermediate part 41.

The blade body 25 consists of a succession of sections S substantially perpendicular to the pitch axis AXPAS. The reference sign S designates any section, reference signs SO, SF, SREF, SINI, SINT, S1, S2, S3, S4, S5, S6, SINF, SRUPT designating special sections if needed.

Thus, the blade root 30 extends from an origin section SO forming the first end 51 to the first section of the main part 40, called the initial section SINI. The initial section SINI may be disposed at a distance from the axis of rotation AX of between 20% and 30% of the rotor radius R, and advantageously equal to 24% of the rotor radius R according to the examples given. The rotor radius R may be a predetermined feature of a blade according to the disclosure, only the blade root having a length that varies from one rotor to another.

The main part 40 extends from this initial section SINI to a final section SF forming the second end 52. The main part 40 further comprises a reference section SREF located at a distance from the axis of rotation AX equal to 70% of the rotor radius R.

Each section S has an aerodynamic profile and extends along a transverse axis from a leading edge BA to a trailing edge BF separated by a distance constituting a chord C. Each section S also has:

- a relative thickness equal to the quotient of its maximum thickness T and its chord C;
- a geometric twist angle relative to the reference section SREF; and
- an offset distance YAC between the pitch axis AXPAS and the quarter-chord line.

Furthermore, each section S of the blade root 30 may have a thick aerodynamic profile and each section S of the main part 40 may have a thin aerodynamic profile. Such a thin aerodynamic profile has a relative thickness of 0.15 or less.

Figure 3:
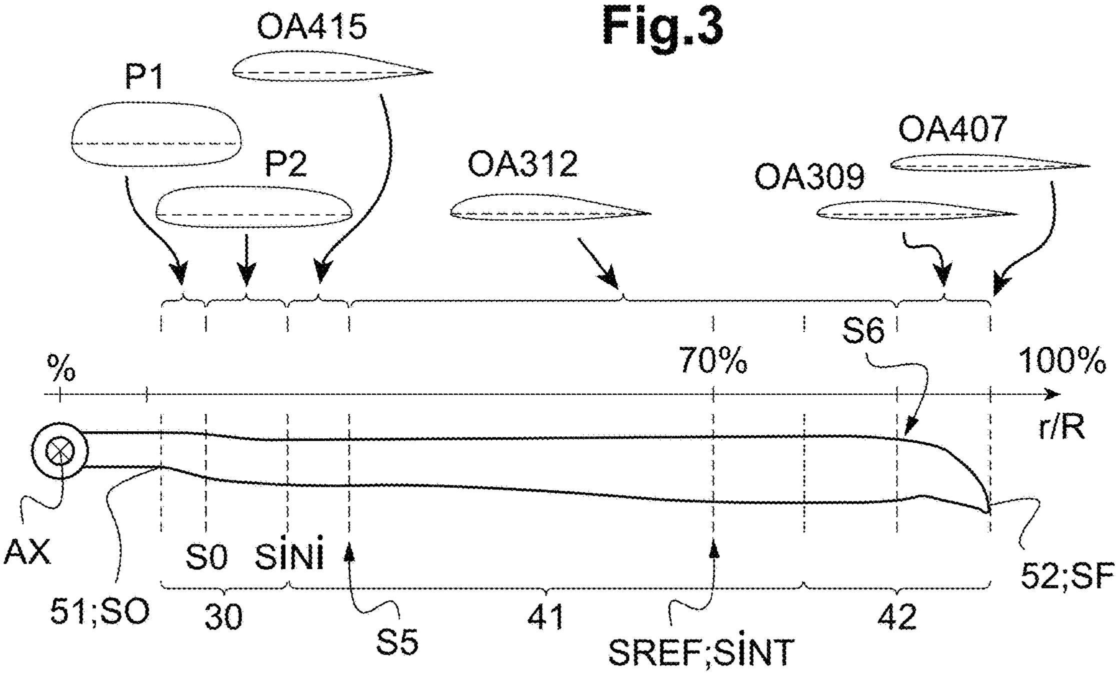
FIG. 3 is a view explaining the profiles of a blade according to the disclosure.

FIG. 3 illustrates examples of aerodynamic profiles.

The blade root 30 may have rounded profiles. For example, the blade root 30 has a first profile P1 from the origin section SO to a section SO1, then a second profile P2 having a smaller relative thickness up to but not including the initial section SINI. For example, the blade root may have profiles established according to the teaching of document EP 3501979 A1.

The main part 40 may have a first profile, for example of the OA415 type, from the initial section SINI inclusive to an internal section S5 exclusive, possibly located at a distance from the axis of rotation AX of between 30% and 35% inclusive of the rotor radius R. The main part 40 may then have a second profile, for example of the OA312 type, from the internal section S5 inclusive to the intermediate section SINT exclusive, this intermediate section SINT may be at a distance from the axis of rotation AX equal for example to 70% of the rotor radius R. The main part 40 may then have the second profile from the intermediate section SINT inclusive to a transition section S6 exclusive which may be at a distance from the axis of rotation AX equal to 90% of the rotor radius R, then a third profile, for example of type OA309, from the transition section S6 inclusive to the final section SF exclusive, and a fourth profile, for example of type OA407 in the final section SF.

Figure 4:
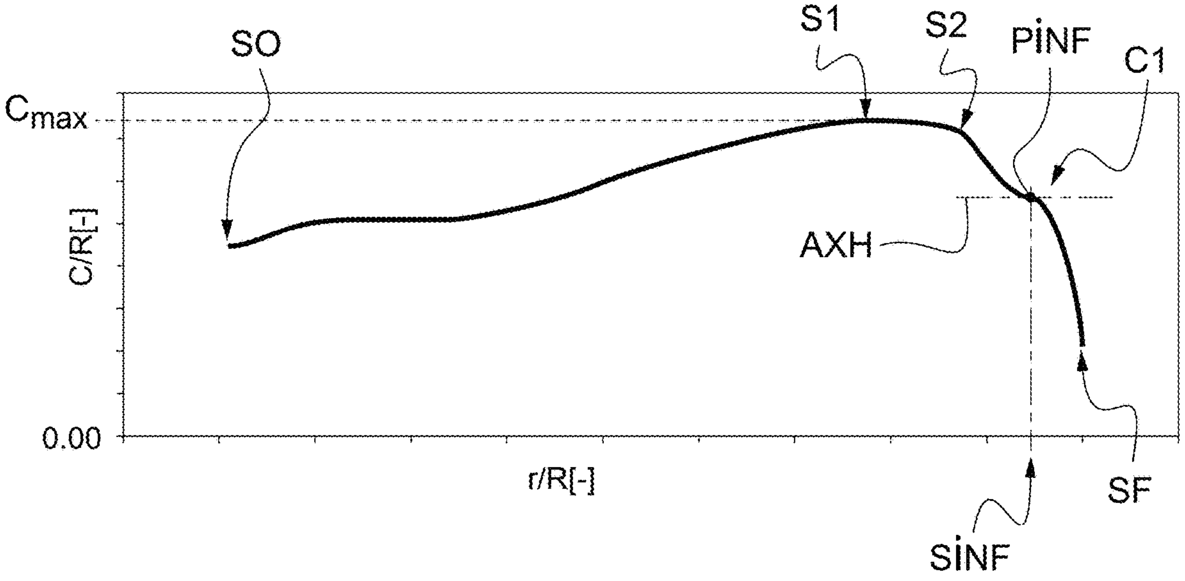
FIG. 4 is a diagram showing the change in the chord of the sections of the blade of FIG. 2 dimensionless with respect to the rotor radius.

In addition, FIG. 4 presents a diagram showing, on the y-axis, the chord C of the sections S dimensionless with respect to the rotor radius R and, on the x-axis, the distance r separating each section of the axis of rotation AX dimensionless with respect to the rotor radius R. This diagram thus illustrates the law relating to the change in the chord of the blade 20.

Regardless of the embodiment, the chord C of the sections S increases from the origin section SO to a maximum chord Cmax. This chord Cmax is reached in a first section S1 located at a first distance from the axis of rotation AX of between 75% and 80% inclusive of the rotor radius R. Then, the chord C decreases along a curve having, firstly, a slow decrease to a second section S2 and then, secondly, a rapid decrease. The expressions "slow decrease" and "rapid decrease" mean that the arithmetic mean of the gradients between two adjacent sections S between the first section S1 and the second section S2 is less than the arithmetic mean of the gradients between two adjacent sections S between the second section S2 and the final section SF.

The second section S2 is positioned at a second distance from the axis of rotation AX of between 80% and 95% inclusive of the rotor radius R.

It should be noted that the average aerodynamic chord Caero dimensionless with respect to the rotor radius R is between 0.05 and 0.08 inclusive. In addition, the maximum chord Cmax dimensionless with respect to the rotor radius R is greater than this average aerodynamic chord Caero dimensionless with respect to the rotor radius R, being between 0.06 and 0.1 inclusive.

In particular, the illustrated examples all have an average aerodynamic chord Caero dimensionless with respect to the rotor radius R equal to 0.0651. According to another aspect, the chord of the sections S may increase from the chord corresponding to the origin section SO to the maximum chord Cmax at an average rate of increase of 4.47%.

The embodiment of FIG. 2 has, for its part, a maximum chord Cmax dimensionless with respect to the rotor radius R equal to 0.0746, the first distance being equal to 78.2% of the rotor radius R. In addition, the second distance is equal to 87% of the rotor radius R. In addition, the decrease in the chord of the sections S of the main part 40 goes from −2.85% to −18.16% at the second section S2. Then, the law relating to the change in the chord has an inflection point PINF in an inflection section SINF located at a third distance from the axis of rotation AX equal to 94.5% of the rotor radius R, the slope of the curve at the inflection point being along the horizontal axis AXH.

Figure 5:
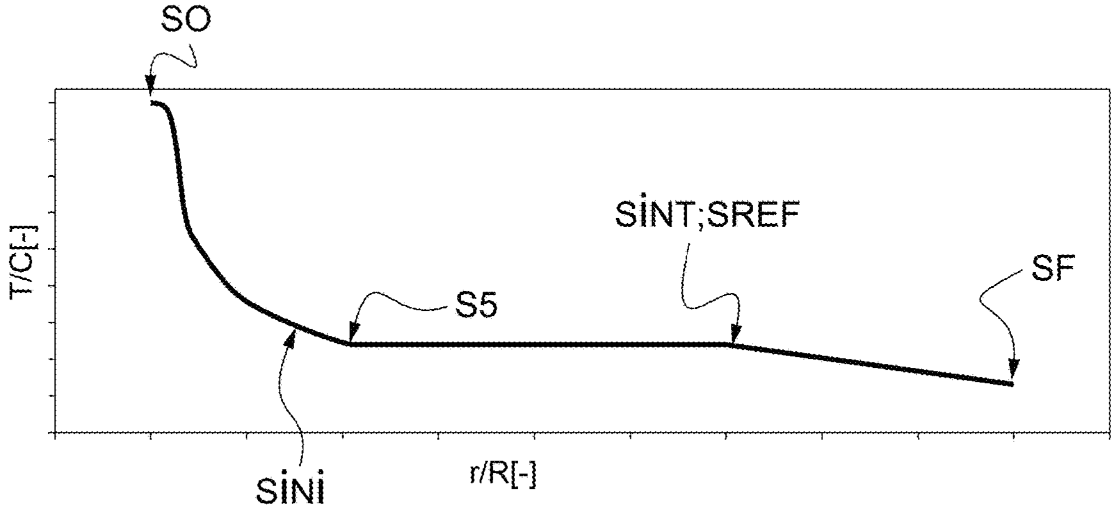
FIG. 5 is a diagram showing the change in the relative thickness of the sections of the blade of FIG. 2.

Furthermore, FIG. 5 presents a diagram showing, on the y-axis, the relative thickness T/C of the sections S and, on the x-axis, the distance r separating each section S from the axis of rotation AX dimensionless with respect to the rotor radius R. This diagram thus illustrates the law relating to the change in relative thickness of the sections of the blade 20.

Regardless of the embodiment, the sections S have a relative thickness T/C which decreases from the origin section SO to the initial section SINI with a relative thickness T/C of between 0.25 and 0.70 inclusive up to a relative thickness T/C of between 0.12 and 0.15 inclusive. The main part 40 has, from the initial section SINI to an intermediate section SINT, a constant relative thickness T/C or a relative thickness T/C which decreases and is then constant in accordance with the examples given. Moreover, the main part 40 has a relative thickness T/C which decreases moving away from the intermediate section SINT to a relative thickness T/C of between 0.07 and 0.08 inclusive in the final section, the intermediate section SINT being at a distance from the axis of rotation AX of between 65% and 85% inclusive of the rotor radius R.

In particular, all the examples illustrated have an initial section SINI having a relative thickness T/C of 0.45. The main part 40 of these examples has, from the initial section SINI, a relative thickness T/C which decreases linearly from a value of 0.15 to a value of 0.12 that is reached at an internal section S5, at between 30% and 35% inclusive of the rotor radius R, then a constant relative thickness T/C up to the intermediate section SINT. The intermediate section SINT is at a distance from the axis of rotation AX equal to 70% of the rotor radius R.

The embodiment shown in FIG. 2 has a main part 40 provided with a relative thickness T/C which decreases linearly away from the intermediate section SINT up to a relative thickness equal to 0.07 in the final section SF.

Figure 6:
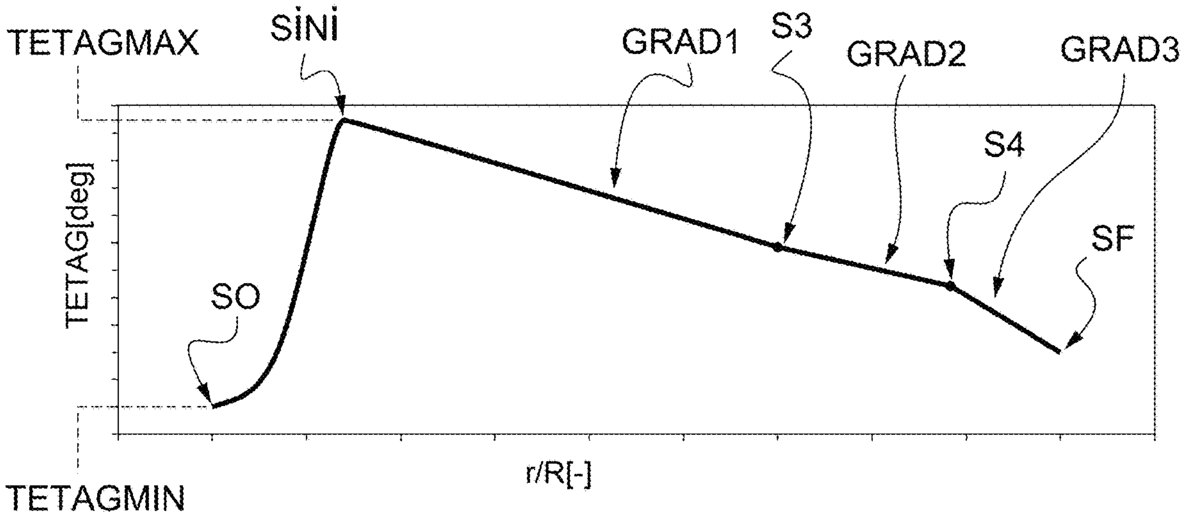
FIG. 6 is a diagram showing the change in the twist angle of the sections of the blade of FIG. 2.

Furthermore, FIG. 6 presents a diagram showing, on the y-axis, the geometric twist angle TETAG of the sections S and, on the x-axis, the distance r separating each section S from the axis of rotation AX dimensionless with respect to the rotor radius R. This diagram thus illustrates the law relating to the change in the twist of the blade 20.

Regardless of the embodiment, the geometric twist angles of the sections S increase continuously from the origin section SO to the initial section SINI from a minimum negative angle TETAGMIN to a maximum positive angle TETAGMAX. Then, the geometric twist angles of the sections decrease with a first gradient GRAD1 of between −9° divided by the rotor radius R and −13° divided by the rotor radius R inclusive, to a third section S3 located at a distance from the axis of rotation AX between 70% and 80% inclusive of the rotor radius R, then with a second gradient GRAD2 egal or higher than the first gradient GRAD1 to a fourth section S4 located at a distance from the axis of rotation AX between 88% and 90% inclusive of the rotor radius R, then with a third gradient GRAD3 lower than the first gradient GRAD1 to the final section SF.

In particular, all the examples illustrated have twist angles that increase in accordance with a convex law at the blade root 30, and a first gradient GRAD1 equal to −10° divided by the rotor radius R.

The embodiment of FIG. 2 has a second gradient GRAD2 equal to −7.3° divided by the rotor radius R, a third gradient GRAD3 equal to −20° divided by the rotor radius R, a fourth section S4 being at a distance from the axis of rotation AX equal to 88% of the rotor radius R.

Figure 7:
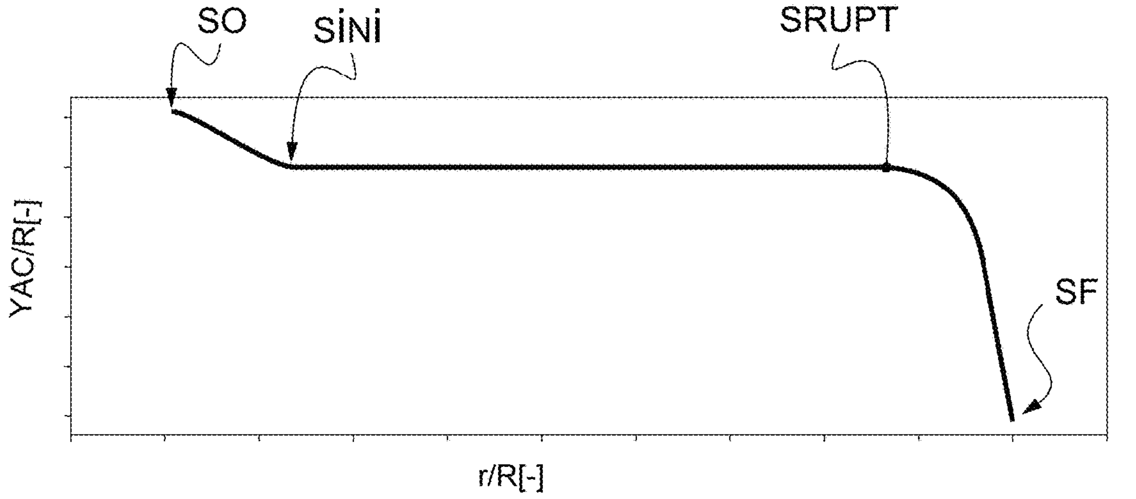
FIG. 7 is a diagram showing the change in the offset of the sections of the blade of FIG. 2.

Furthermore, FIG. 7 presents a diagram showing, on the y-axis, the offset distance of the sections S dimensionless with respect to the rotor radius R and, on the x-axis, the distance r separating each section S from the axis of rotation AX dimensionless with respect to the rotor radius R. This diagram thus illustrates the law relating to the change in the offset of the sections S of the blade 20.

Regardless of the embodiment, in each section S, an offset distance separates the pitch axis AXPAS from a point Pt located at a quarter of the chord C of this section S starting from the leading edge BA. The points Pt of the sections S form a line called a quarter-chord line by a person skilled in the art.

This offset distance decreases from the origin section SO to the initial section SINI, then is constant in the main part 40 from the initial section SINI to a rupture section SRUPT, and finally decreases to the final section. The rupture section SRUPT is at a distance from the axis of rotation AX of between 80% and 95% inclusive of the rotor radius R.

In particular, the examples illustrated all have an offset distance at the origin section SO which is equal to a quarter of the chord of this origin section SO. In other words, the pitch axis and the quarter-chord line are coincident in the origin section SO.

Moreover, the offset distance dimensionless with respect to the rotor radius R is equal to +0.041% of the rotor radius R in a segment running from the initial section SINI to the rupture section SRUPT, the quarter-chord line of this segment being between the pitch axis AXPAS and the leading edge BA of this segment.

The embodiment of FIG. 7 has a rupture section SRUPT positioned at a distance from the axis of rotation AX equal to 85% of the rotor radius R. The offset distance dimensionless with respect to the rotor radius R is also equal to 0.051 in the final section SF with a quarter-chord point located between the pitch axis AXPAS and the trailing edge BF. The offset distance dimensionless with respect to the rotor radius R varies in accordance with a hyperbolic tangent law, from the rupture section SRUPT to the final section SF. This hyperbolic tangent law may take the following form:

$$\frac{YAC\left(\frac{r}{R}\right)}{R} = \frac{YAC_{tip}}{R} + \frac{YAC_0 - YAC_{tip}}{R\tanh\left[k\left(1 - \frac{r_D}{R}\right)\right]}\tanh\left[k\left(1 - \frac{r}{R}\right)\right]$$

with "YAC" the offset distance, "R" the rotor radius, "r" the radius separating the section concerned from the axis of rotation, "$YAC_{tip}$" equal to −0.051 multiplied by the rotor radius R, "$YAC_0$" equal to 0.041 multiplied by the rotor radius R, "$r_D/R$" equal to 0.85, and "k" equal to 23.1.

The embodiments of FIGS. 8 to 17 have tips 42 that differ from the embodiment of FIGS. 2 to 7.

FIGS. 8 to 11 illustrate a first variant V1 which differs from the embodiment of FIG. 2 by its laws of variation of the chord C, of the relative thickness and of offset at the level of the tip 42. The twisting law is identical to the law of the embodiment of FIGS. 2 to 7 described previously.

As for the embodiment of FIG. 2 and with reference to FIG. 9, for this first variant V1, the maximum chord Cmax dimensionless with respect to the rotor radius R is equal to 0.0746, the first distance being equal to 78.2% of the rotor radius R. In addition, the second distance separating the second section S2 from the axis of rotation AX is equal to 87% of the rotor radius R. It should be noted that the decrease goes from −2.85% to −18.16% at the second section S2. The chord C decreases from the second section S2 along a curve having an inflection point PINF in an inflection section SINF located at a third distance from the axis of rotation AX equal to 94.5% of the rotor radius R, but the slope of the curve at the inflection point is along an oblique axis AXO instead of a horizontal axis for the blade of FIG. 2.

Figure 10:
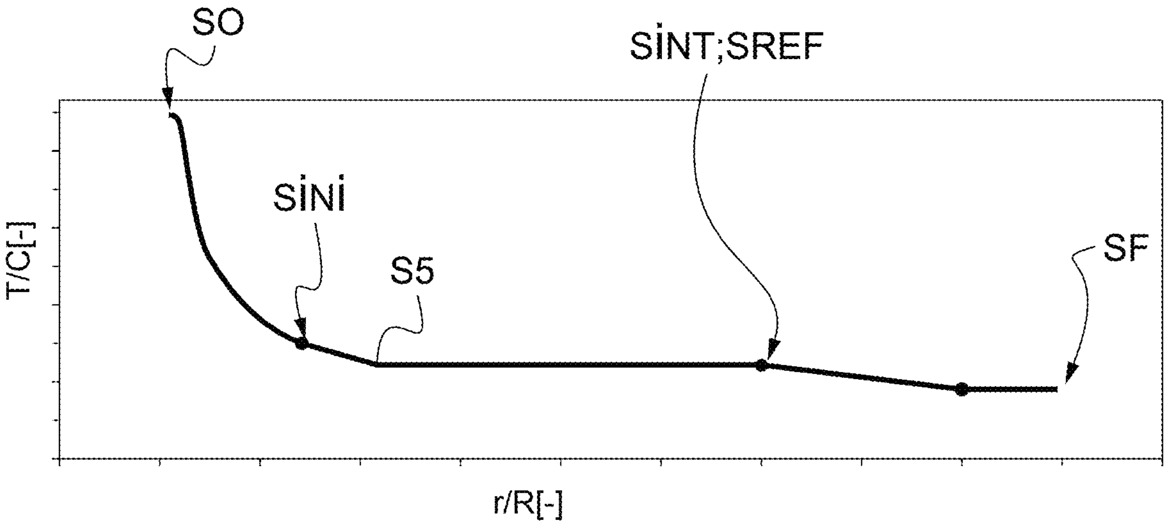
FIG. 10 is a diagram showing the change in the relative thickness of the sections of the blade of FIG. 8.

With reference to FIG. 10, the tip 42 of the main part 40 has a relative thickness T/C which decreases linearly moving away from the intermediate section SINT to a thickness equal to 0.08 at a section located at a distance from the axis of rotation equal to 90% of the rotor radius R, then remains constant up to and including the final section SF.

Figure 11:
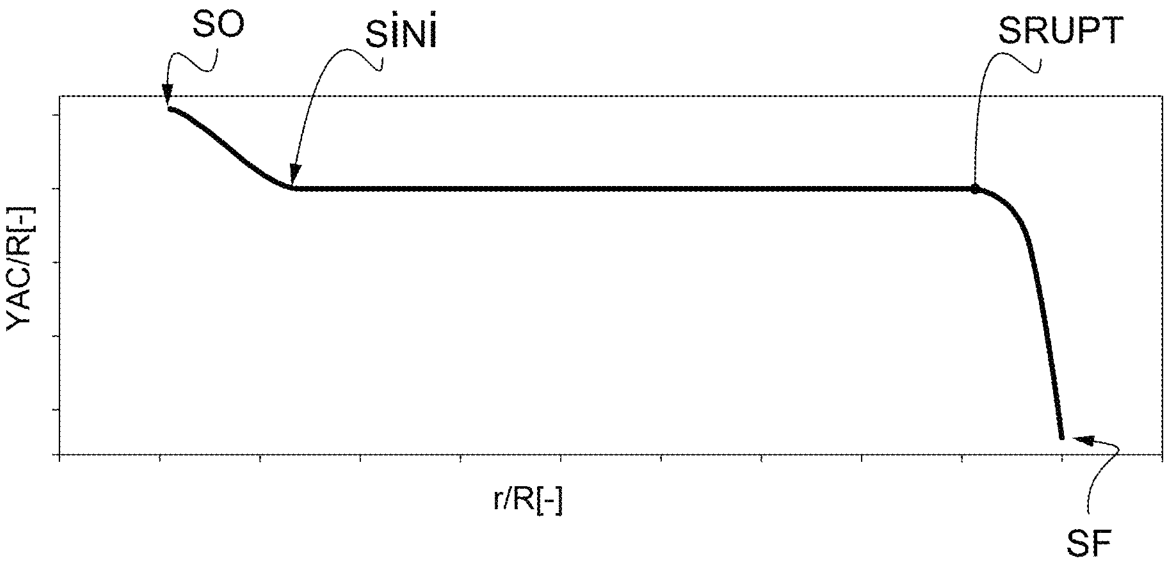
FIG. 11 is a diagram showing the change in the offset of the sections of the blade of FIG. 8.

With reference to FIG. 11, the rupture section SRUPT is at a distance from the axis of rotation AX equal to 91.5% of the rotor radius R. The offset distance dimensionless with respect to the rotor radius R is equal to 0.03384 in the final section SF with a quarter-chord point located between the pitch axis AXPAS and the trailing edge BF. The offset distance dimensionless with respect to the rotor radius R varies according to a hyperbolic tangent law, from the rupture section SRUPT to the final section SF. This hyperbolic tangent law may take the following form:

$$\frac{YAC\left(\frac{r}{R}\right)}{R} = \frac{YAC_{tip}}{R} + \frac{YAC_0 - YAC_{tip}}{R\tanh\left[k\left(1 - \frac{r_D}{R}\right)\right]}\tanh\left[k\left(1 - \frac{r}{R}\right)\right]$$

with "YAC" the offset distance, "R" the rotor radius, "r" the radius separating the section concerned from the axis of rotation, "$YAC_{tip}$" equal to −0.03384 multiplied by the rotor radius R, "$YAC_0$" equal to 0.041 multiplied by the rotor radius R, "$r_D/R$" equal to 0.85, and "k" equal to 31.

FIGS. 12 to 15 illustrate a second variant V2 which differs from the embodiment of FIGS. 2 to 7 by its laws of variation of the chord, twist and offset at the tip 42. The law of variation of the relative thickness is identical to the law of the embodiment of FIGS. 2 to 7 described previously.

With reference to FIG. 13, as for the blades of FIGS. 2 to 11, the maximum chord Cmax dimensionless with respect to the rotor radius R is equal to 0.0746, the first distance being equal to 78.2% of the rotor radius R. On the other hand, the second distance is equal to 94.5% of the rotor radius R.

Figure 14:
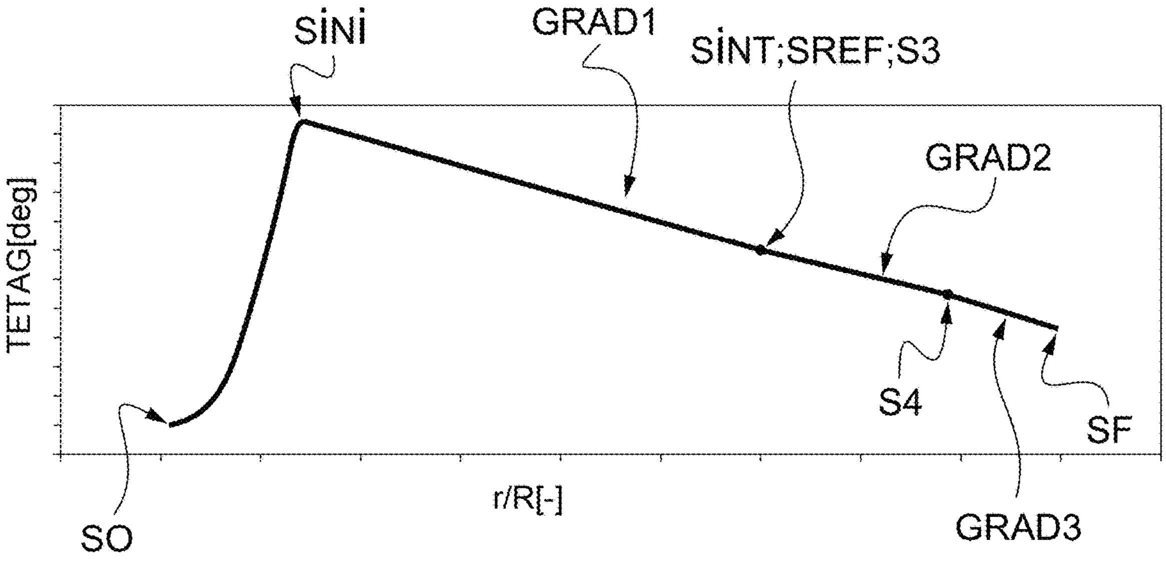
FIG. 14 is a diagram showing the change in the twist angle of the sections of the blade of FIG. 13.

With reference to FIG. 14, the second variant V2 differs from the embodiment of FIGS. 2 to 7 by having a second gradient GRAD2 equal to −10° divided by the rotor radius R, a third gradient GRAD3 equal to −20° divided by the rotor radius R, the fourth section S4 also being at a distance from the axis of rotation AX equal to 88% of the rotor radius R.

Figure 15:
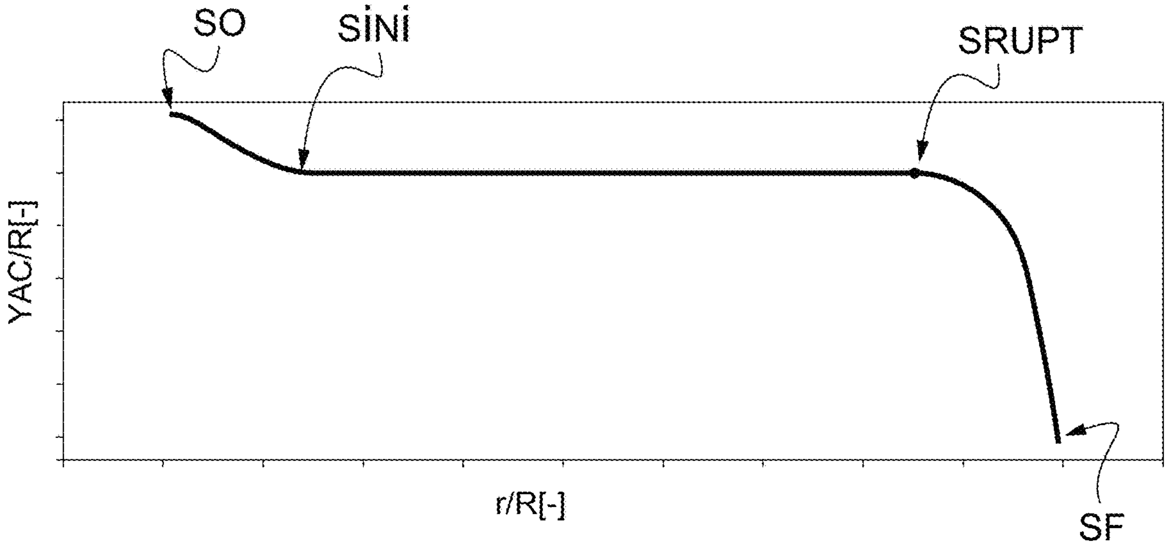
FIG. 15 is a diagram showing the change in the offset of the sections of the blade of FIG. 13.

With reference to FIG. 15, as for the blade 20 of FIGS. 2 to 7, the rupture section SRUPT is at a distance from the axis of rotation AX equal to 85% of the rotor radius R, the offset distance dimensionless with respect to the rotor radius R being equal to 0.051 in the final section SF with a quarter-chord point located between the pitch axis AXPAS and the trailing edge BF. On the other hand, the offset distance dimensionless with respect to the rotor radius R varies in accordance with a predetermined law from the rupture section SRUPT to the final section SF. This predetermined law is:

$$\frac{YAC\left(\frac{r}{R}\right)}{R} = \frac{YAC_{tip}}{R} + \frac{YAC_0 - \frac{d}{R}\exp\left[\left(\frac{r_D - u}{sig}\right)^2\right] - YAC_{tip}}{R\tanh\left[k\left(1 - \frac{r_D}{R}\right)\right]}\tanh\left[k\left(1 - \frac{r}{R}\right)\right] + \frac{d}{R}\exp\left[\left(\frac{r - u}{sig}\right)^2\right]$$

with "YAC" the offset distance, "R" the rotor radius, "r" the radius separating the section concerned from the axis of rotation, "$YAC_{tip}$" equal to −0.051 multiplied by the rotor radius R, "$YAC_0$" equal to 0.041 multiplied by the rotor radius R, "$r_D/R$" equal to 0.85, "k" equal to 23.1, "d" equal to −0.29% of the rotor radius R, "u" equal to 92.8% of the rotor radius R and "sig" equal to 3.7% of the rotor radius R.

FIGS. 16 to 17 illustrate a third variant V3 which differs from the embodiment of FIGS. 2 to 7 only by its offset law at the tip 42.

Thus, this blade 20 comprises a maximum chord Cmax dimensionless with respect to the rotor radius R equal to 0.0746, the first distance being equal to 78.2% of the rotor radius R and the second distance being equal to 94.5% of the rotor radius R.

The main part 40 has a relative thickness T/C which decreases linearly moving away from the intermediate section SINT up to a relative thickness T/C equal to 0.07 in the final section SF.

In addition, the second gradient GRAD2 is equal to −10° divided by the rotor radius R, the third gradient GRAD3 is equal to −20° divided by the rotor radius R, the fourth section S4 being at a distance from the axis of rotation AX equal to 88% of the rotor radius R.

On the other hand, and with reference to FIG. 17, the rupture section SRUPT is now at a distance from the axis of rotation AX equal to 94% of the rotor radius R. The offset distance dimensionless with respect to the rotor radius R is equal to 0.03384 in the final section SF with a quarter-chord point located between the pitch axis AXPAS and the trailing edge BF. Finally, the offset distance dimensionless with respect to the rotor radius R varies in accordance with the following predetermined law from the rupture section SRUPT to the final section SF:

$$\frac{YAC\left(\frac{r}{R}\right)}{R} = \frac{YAC_{tip}}{R} + \frac{YAC_0 - \frac{d}{R}\exp\left[\left(\frac{r_D - u}{sig}\right)^2\right] - YAC_{tip}}{R\tanh\left[k\left(1 - \frac{r_D}{R}\right)\right]}\tanh\left[k\left(1 - \frac{r}{R}\right)\right] + \frac{d}{R}\exp\left[\left(\frac{r - u}{sig}\right)^2\right]$$

with "YAC" the offset distance, "R" the rotor radius, "r" the radius separating the section concerned from the axis of rotation, "$YAC_{tip}$" equal to −0.03384 multiplied by the rotor radius R, "$YAC_0$" equal to 0.041 multiplied by the rotor radius R, "$r_D/R$" equal to 0.85, "k" equal to 32, "d" equal to 0.15% of the rotor radius R, "u" equal to 95.5 of the rotor radius R and "sig" equal to 1.3% of the rotor radius R.

Naturally, the present disclosure may be subjected to numerous variations as to its implementation. Although several embodiments are described above, it should readily be understood that it is not conceivable to identify exhaustively all the possible embodiments. It is of course possible to replace any of the means described with equivalent means without going beyond the ambit of the present disclosure.

What is claimed is:

1. A blade for a rotary wing of an aircraft, the blade being able to rotate about an axis of rotation of the rotary wing and about a pitch axis, the blade extending along the pitch axis from a first end to a second end, the blade comprising a blade body having, along the pitch axis, a blade root and then a main part formed by a succession of sections substantially perpendicular to the pitch axis, the blade root being provided with an origin section forming the first end, the main part extending along the pitch axis from an initial section to a final section forming the second end, the final section being located at a distance equal to a predetermined rotor radius from the axis of rotation, each section extending along a transverse axis from a leading edge to a trailing edge separated by a maximum distance constituting a chord, each section of the blade body having a geometric twist angle with respect to a reference section located at a distance from the axis of rotation equal to 70% of the rotor radius, wherein:

the initial section is disposed at a distance from the axis of rotation of between 20% and 30% of the rotor radius;

the chord of the sections increases from the origin section to a maximum chord reached in a first section located at a first distance from the axis of rotation of between 75% and 80% of the rotor radius, then decreases in accordance with a law having firstly a slow decrease to a second section then secondly a rapid decrease, the second section being located at a second distance from the axis of rotation of between 80% and 95% of the rotor radius, an average aerodynamic chord dimensionless with respect to the rotor radius being between 0.05 and 0.08, the maximum chord dimensionless with respect to the rotor radius being greater than the average aerodynamic chord dimensionless with respect to the rotor radius and between 0.06 and 0.1;

the sections have a relative thickness which decreases from the origin section to the initial section by a relative thickness of between 0.25 and 0.70 to a relative thickness of between 0.12 and 0.15, the main part having, from the initial section to an intermediate section, a constant relative thickness or a relative thickness which decreases and is then constant, the main part having a relative thickness which decreases moving away from the intermediate section to a relative thickness of between 0.07 and 0.08 in the final section, the intermediate section being at a distance from the axis of rotation of between 65% and 85% of the rotor radius;

the angles of geometric twist increase continuously from the origin section to the initial section from a minimum negative angle to a maximum positive angle and then decrease with a first gradient of between −9° divided by the rotor radius and −13° divided by the rotor radius to a third section located at a distance from the axis of rotation of between 70% and 80% of the rotor radius, then with a second gradient egal or higher than the first gradient to a fourth section located at a distance from the axis of rotation of between 88% and 90% of the rotor radius, then with a third gradient less than the first gradient to the final section; and an offset distance separating the pitch axis from a quarter-chord line for each section decreases from the origin section to the initial section, the offset distance being constant in the main part from the initial section to a rupture section and then decreases, the rupture section being at a distance from the axis of rotation of between 80% and 95% of the rotor radius.

2. The blade according to claim 1, wherein the main part comprises a first profile from the initial section to an internal section located at a distance from the axis of rotation of between 30% and 35% of the rotor radius, a second profile from the internal section to the intermediate section, the second profile from the intermediate section to a transition section, a third profile from the transition section to the final section, and a fourth profile in the final section.

3. The blade according to claim 1, wherein the blade comprises the following features:

the chord of the sections increases from the origin section to the maximum chord reached at an average rate of increase of 4.47%;

the initial section has a relative thickness of 0.45, the main part having, from the initial section, a relative thickness which decreases linearly from a value of 0.15 to 0.12 at an internal section and is then constant up to the intermediate section, the intermediate section being at a distance from the axis of rotation equal to 70% of the rotor radius;

the twist angles increase in accordance with a convex law at the blade root, the first gradient is equal to −10° divided by the rotor radius; and the quarter-chord line is located on the pitch axis at the origin section, the offset distance being equal to +0.041% of the rotor radius in a segment going from the initial section to the rupture section, the quarter-chord line of the segment being located between the pitch axis and the leading edge of the segment.

4. The blade according to claim 3, wherein the blade comprises the following features:

the initial section is disposed at a distance from the axis of rotation equal to 24% of the rotor radius; and the average aerodynamic chord dimensionless with respect to the rotor radius is equal to 0.0651.

5. The blade according to claim 1, wherein:

the maximum chord dimensionless with respect to the rotor radius is equal to 0.0746, the first distance being equal to 78.2% of the rotor radius;

the second distance is equal to 87% of the rotor radius, the decrease in the chord of the sections of the main part going from −2.85% to −18.16% at the second section, the chord decreasing from the second section along a curve having an inflection point in an inflection section located at a third distance from the axis of rotation equal to 94.5% of the rotor radius, a slope of the curve at the inflection point being along a horizontal axis;

the main part has a relative thickness which decreases linearly moving away from the intermediate section, to a relative thickness equal to 0.07 in the final section;

the second gradient is equal to −7.3° divided by the rotor radius, the third gradient is equal to −20° divided by the rotor radius, the fourth section being at a distance from the axis of rotation equal to 88% of the rotor radius; and the rupture section being at a distance from the axis of rotation equal to 85% of the rotor radius, the offset distance dimensionless with respect to the rotor radius being equal to 0.051 in the final section with a quarter-chord point located between the pitch axis and the trailing edge, the offset distance dimensionless with respect to the rotor radius varying in accordance with a hyperbolic tangent law from the rupture section to the final section.

6. The blade according to claim 5, wherein the hyperbolic tangent law is defined by the equation:

$$\frac{YAC\left(\frac{r}{R}\right)}{R} = \frac{YAC_{tip}}{R} + \frac{YAC_0 - YAC_{tip}}{R\tanh\left[k\left(1 - \frac{r_D}{R}\right)\right]}\tanh\left[k\left(1 - \frac{r}{R}\right)\right]$$

with "YAC" the offset distance, "R" the rotor radius, "r" the radius separating the section concerned from the axis of rotation, "$YAC_{tip}$" equal to −0.051 multiplied by the rotor radius, "$YAC_0$" equal to 0.041 multiplied by the rotor radius, "$r_D/R$" equal to 0.85, and "k" equal to 23.1.

7. The blade according to claim 1, wherein:

the maximum chord dimensionless with respect to the rotor radius is equal to 0.0746, the first distance being equal to 78.2% of the rotor radius;

the second distance is equal to 87% of the rotor radius, the decrease going from −2.85% to −18.16% at the second section, the chord decreasing from the second section along a curve having an inflection point in an inflection section located at a third distance from the axis of rotation equal to 94.5% of the rotor radius, a slope of the curve at the inflection point being along an oblique axis;

the main part having a relative thickness which decreases linearly moving away from the intermediate section to a thickness equal to 0.08 of a section being at a distance from the axis of rotation equal to 90% of the rotor radius up to and including the final section;

the second gradient is equal to −7.3° divided by the rotor radius, the third gradient is equal to −20° divided by the rotor radius, the fourth section being at a distance from the axis of rotation equal to 88% of the rotor radius; and the rupture section being at a distance from the axis of rotation equal to 91.5% of the rotor radius, the offset distance dimensionless with respect to the rotor radius being equal to 0.03384 in the final section with a quarter-chord point located between the pitch axis and the trailing edge, the offset distance dimensionless with respect to the rotor radius varying according to a hyperbolic tangent law from the rupture section to the final section.

8. The blade according to claim 7, wherein the hyperbolic tangent law is defined by the equation:

$$\frac{YAC\left(\frac{r}{R}\right)}{R} = \frac{YAC_{tip}}{R} + \frac{YAC_0 - YAC_{tip}}{R\tanh\left[k\left(1 - \frac{r_D}{R}\right)\right]}\tanh\left[k\left(1 - \frac{r}{R}\right)\right]$$

with "YAC" the offset distance, "R" the rotor radius, "r" the radius separating the section concerned from the axis of rotation, "$YAC_{tip}$" equal to −0.03384 multiplied by the rotor radius, "$YAC_0$" equal to 0.041 multiplied by the rotor radius, "$r_D/R$" equal to 0.85, and "k" equal to 31.

9. The blade according to claim 1, wherein:

the maximum chord dimensionless with respect to the rotor radius is equal to 0.0746, the first distance being equal to 78.2% of the rotor radius;

the second distance is equal to 94.5% of the rotor radius;

the main part having a relative thickness which decreases linearly moving away from the intermediate section to a relative thickness equal to 0.07 in the final section;

the second gradient is equal to −10° divided by the rotor radius, the third gradient is equal to −20° divided by the rotor radius, the fourth section being at a distance from the axis of rotation equal to 88% of the rotor radius; and the rupture section being at a distance from the axis of rotation equal to 85% of the rotor radius, the offset distance dimensionless with respect to the rotor radius being equal to 0.051 in the final section with a quarter-chord point located between the pitch axis and the trailing edge, the offset distance dimensionless with respect to the rotor radius varying in accordance with a predetermined law from the rupture section to the final section.

10. The blade according to claim 9, wherein the predetermined law is defined by the equation:

$$\frac{YAC\left(\frac{r}{R}\right)}{R} = \frac{YAC_{tip}}{R} + \frac{YAC_0 - \frac{d}{R}\exp\left[\left(\frac{r_D - u}{sig}\right)^2\right] - YAC_{tip}}{R\tanh\left[k\left(1 - \frac{r_D}{R}\right)\right]}\tanh\left[k\left(1 - \frac{r}{R}\right)\right] + \frac{d}{R}\exp\left[\left(\frac{r - u}{sig}\right)^2\right]$$

with "YAC" the offset distance, "R" the rotor radius, "r" the radius separating the section concerned from the axis of rotation, "$YAC_{tip}$" equal to −0.051 multiplied by the rotor radius, "$YAC_0$" equal to 0.041 multiplied by the rotor radius, "$r_D/R$" equal to 0.85, "k" equal to 23.1, "d" equal to −0.29% of the rotor radius, "u" equal to 92.8% of the rotor radius R and "sig" equal to 3.7% of the rotor radius.

11. The blade according to claim 1, wherein:

the maximum chord dimensionless with respect to the rotor radius is equal to 0.0746, the first distance being equal to 78.2% of the rotor radius;

the second distance is equal to 94.5% of the rotor radius;

the main part having a relative thickness which decreases linearly moving away from the intermediate section to a relative thickness equal to 0.07 in the final section;

the second gradient is equal to −10° divided by the rotor radius, the third gradient is equal to −20° divided by the rotor radius, the fourth section being at a distance from the axis of rotation equal to 88% of the rotor radius; and the rupture section being at a distance from the axis of rotation equal to 94% of the rotor radius, the offset distance dimensionless with respect to the rotor radius being equal to 0.03384 in the final section with a quarter-chord point located between the pitch axis and the trailing edge, the offset distance dimensionless with respect to the rotor radius varying according to a predetermined law from the rupture section to the final section.

12. The blade according to claim 11, wherein the predetermined law is defined by the equation:

$$\frac{YAC\left(\frac{r}{R}\right)}{R} = \frac{YAC_{tip}}{R} + \frac{YAC_0 - \frac{d}{R}\exp\left[\left(\frac{r_D - u}{sig}\right)^2\right] - YAC_{tip}}{R\tanh\left[k\left(1 - \frac{r_D}{R}\right)\right]}\tanh\left[k\left(1 - \frac{r}{R}\right)\right] + \frac{d}{R}\exp\left[\left(\frac{r - u}{sig}\right)^2\right]$$

with "YAC" the offset distance, "R" the rotor radius, "r" the radius separating the section concerned from the axis of rotation, "$YAC_{tip}$" equal to −0.03384 multiplied by the rotor radius, "$YAC_0$" equal to 0.041 multiplied by the rotor radius, "$r_D/R$" equal to 0.85, "k" equal to 32, "d" equal to 0.15% of the rotor radius, "u" equal to 95.5 of the rotor radius and "sig" equal to 1.3% of the rotor radius.

13. The blade according to claim 1, wherein the main part comprises, starting from the blade root, an intermediate part followed by a tip, the tip having a zero dihedral with respect to the intermediate part.

14. A rotary wing provided with a hub able to rotate about an axis of rotation, the rotary wing comprising at least one blade attached to the hub, wherein the blade is according to claim 1.

15. An aircraft provided with a rotary wing, wherein the rotary wing is according to claim 14.

* * * * *